US012558969B2

(12) United States Patent
Zeid et al.

(10) Patent No.: US 12,558,969 B2
(45) Date of Patent: Feb. 24, 2026

(54) COMPUTER SYSTEM FOR DETECTING AND CONTROLLING A RELATIVE POSITION OF TWO ROTATING ECCENTRIC SHAFTS, VEHICLE COMPRISING SUCH A COMPUTER SYSTEM, METHOD, AND STORAGE MEDIUM FOR PERFORMING SUCH A METHOD

(71) Applicant: Volvo Construction Equipment AB, Eskilstuna (SE)

(72) Inventors: Ashraf Zeid, Carlisle, PA (US); Hongan Xu, Mechanicsburg, PA (US); Parshva Adani, Shippensburg, PA (US); Youngjin Kim, Shippensburg, PA (US)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 65 days.

(21) Appl. No.: 18/765,834

(22) Filed: Jul. 8, 2024

(65) Prior Publication Data

US 2025/0050743 A1     Feb. 13, 2025

(30) Foreign Application Priority Data

Aug. 8, 2023     (EP) ..................................... 23190401

(51) Int. Cl.
*B60L 15/20*          (2006.01)
*E01C 19/28*          (2006.01)
(52) U.S. Cl.
CPC ............ *B60L 15/20* (2013.01); *E01C 19/286* (2013.01); *B60L 2200/40* (2013.01); *B60L 2240/421* (2013.01)
(58) Field of Classification Search
CPC ................. B60L 15/20; B60L 2200/40; B60L 2240/421; E01C 19/286
See application file for complete search history.

(56) References Cited

U.S. PATENT DOCUMENTS 4,972,332 A * 11/1990 Luebbering ............. G01P 3/481
                                                        340/672
7,121,240 B2 * 10/2006 Tani ........................ F01L 1/352
                                                        123/90.11
(Continued)

FOREIGN PATENT DOCUMENTS

CN          106930172 A      7/2017
CN          107276479 A      10/2017
(Continued)

OTHER PUBLICATIONS

European Search Report in corresponding European Application No. 23190401.2 dated Jan. 16, 2024 (2 pages).

(Continued)

*Primary Examiner* — Gertrude Arthur Jeanglaude
(74) *Attorney, Agent, or Firm* — Jeffri A. Kaminski; Venable LLP

(57)          ABSTRACT

A computer system detects and controls a relative position of two rotating eccentric shafts. Processing circuitry calculates a lead motor quadrature current of a lead motor driving a first eccentric shaft; calculates a follower motor quadrature current of a follower motor driving a second eccentric shaft; determines in real-time a phase angle between the lead motor and follower motor quadrature currents; modifies a rotation speed of the follower motor so that it is equal to a rotation speed of the leading motor; and when the rotation speed of the follower motor is equal to the rotation speed of the lead motor, modifies the rotation speed of the follower motor to adjust the phase angle to be equal to a main target phase angle.

15 Claims, 4 Drawing Sheets

(56)        References Cited

U.S. PATENT DOCUMENTS

|  |  |  |  |  |
|---|---|---|---|---|
| 9,231,462 | B2 * | 1/2016 | Hunter | H02K 7/075 |
| 9,334,613 | B2 | 5/2016 | Erdmann et al. | |
| 10,415,965 | B2 * | 9/2019 | Fedigan | G01C 9/06 |
| 10,569,319 | B2 * | 2/2020 | Grant | B21D 1/02 |
| 11,286,625 | B2 * | 3/2022 | Macdonald | B06B 1/16 |
| 2016/0097382 | A1 * | 4/2016 | Kamen | G16H 50/00 |
| | | | | 417/374 |
| 2021/0395959 | A1 | 12/2021 | Grove et al. | |

FOREIGN PATENT DOCUMENTS

| | | | | |
|---|---|---|---|---|
| CN | 110417308 | A | | 11/2019 |
| JP | 2017530365 | A | * | 10/2017 |
| WO | 2018174853 | A1 | | 9/2018 |

OTHER PUBLICATIONS

Zhiyue Yu et al; "Continuous Rotor Position Estimation for Flux Modulated Doubly Salient Reluctance Motor Drives Based on Back EMF Harmonics"; IEEE Transactions on Industrial Electronics; IEEE Service Center, Piscataway, NJ, USA; vol. 70, No. 6, Jun. 2023; pp. 5604-5614 (11 pages), XP011933088, ISSN: 0278-0046, DOI: 10.1109/TIE.2022.3196378.

* cited by examiner

COMPUTER SYSTEM FOR DETECTING AND CONTROLLING A RELATIVE POSITION OF TWO ROTATING ECCENTRIC SHAFTS, VEHICLE COMPRISING SUCH A COMPUTER SYSTEM, METHOD, AND STORAGE MEDIUM FOR PERFORMING SUCH A METHOD

TECHNICAL FIELD

The disclosure relates generally to construction vehicles, more particularly to vibratory compaction machines. In particular aspects, the disclosure relates to a computer system for synchronizing a lead motor and a follower motor, a vehicle comprising such a computer system, a method and a storage medium for performing such a method. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Vibratory compaction machines, also called roller compactors, uses one or more cylindrical drums, generally two, to compact substrates, such as soil or asphalt. The cylindrical drums generally comprise an eccentric shaft that rotates in order to cause the drum to vibrate, increasing the compaction efficiency. However, this causes disturbances to the surrounding environment, especially causing noise due to the vibrations, which is dependent on a relative position of the eccentric shafts. Therefore, there is a need to control the relative position of the eccentric shafts.

SUMMARY

According to a first aspect of the disclosure, the invention relates to a computer system for detecting and controlling a relative position of two rotating eccentric shafts, the computer system comprising processing circuitry configured to:
    calculate a lead motor quadrature current of a lead motor driving a first eccentric shaft among the two eccentric shafts;
    calculate a follower motor quadrature current of a follower motor driving a second eccentric shaft among the two eccentric shafts;
    determine in real-time a phase angle between the lead motor and follower motor quadrature currents;
    modify a rotation speed of the follower motor so that it is equal to a rotation speed of the leading motor by a closed loop control; and
    when the rotation speed of the follower motor is equal to the rotation speed of the lead motor, modify the rotation speed of the follower motor to adjust the phase angle to be equal to a main target phase angle. The first aspect of the disclosure may seek to detect and control a relative position of two rotating eccentric shafts, in order to control the amount of noise and timing of vibrations generated by the eccentric shafts. A technical benefit may include decreasing the noise generated by the eccentric shafts or the coordination of impact of multiple drums.
    Optionally in some examples, including in at least one preferred example, the processing circuitry is further configured to:

modify the rotation speed of the follower motor to adjust the phase angle to be equal to an auxiliary target phase angle by a closed control loop; and
    when the phase angle is equal to the auxiliary target phase angle and when the rotation speed of the follower motor is equal to the rotation speed of the lead motor, modify the rotation speed of the follower motor to adjust the phase angle to be equal to the main target phase angle. A technical benefit may include more efficient position control.
    Optionally in some examples, including in at least one preferred example, the processing circuitry is further configured to, in addition to modifying the rotation speed of the follower motor, modify the rotation speed of the lead motor to adjust the phase angle to be equal to the main target phase angle. A technical benefit may include faster and more effective adjustment of the phase angle.
    Optionally in some examples, including in at least one preferred example, the processing circuitry is further configured to, when the phase angle is equal to the main target phase angle, control the rotation speed of the lead motor and/or the follower motor to maintain the phase angle equal to the main target phase angle. A technical benefit may include maintaining the main target phase angle during subsequent use of the eccentric shafts.
    Optionally in some examples, including in at least one preferred example, the processing circuitry is configured to determine the phase angle between the lead motor and follower motor quadrature currents by a phase locked loop. A technical benefit may include efficient phase angle determination.
    According to a second aspect of the disclosure, the invention relates to a vehicle comprising the computer system previously described. The second aspect of the disclosure may seek to implement relative position control of two eccentric shafts from a vehicle. A technical benefit may include easy and efficient relative position control of two eccentric shafts from a vehicle to decrease vibrations generated by the eccentric shafts.
    Optionally in some examples, including in at least one preferred example, the vehicle further comprises:
        a lead motor and a follower motor; and
        a first and a second drum, the first drum comprising a first eccentric shaft and the second drum comprising a second eccentric shaft, the first eccentric shaft being connected to the lead motor, the lead motor being configured to drive the first eccentric shaft and the second eccentric shaft being connected to the follower motor, the follower motor being configured to drive the second eccentric shaft. A technical benefit may include performing relative position control of the eccentric shafts of the vehicle.
    Optionally in some examples, including in at least one preferred example, at least one of the lead motor and the follower motor is a brushless direct current motor. A technical benefit may include having a more efficient motor current calculation and a more robust and durable motor.
    According to a third aspect of the disclosure, the invention relates to a computer-implemented method for detecting and controlling the relative position between two rotating eccentric shafts, the method comprising:
        calculating, by a processing circuitry of a computer system, a lead motor quadrature current of a lead motor, the lead motor driving a first eccentric shaft among the two eccentric shafts;

calculating, by the processing circuitry, a follower motor quadrature current of a follower motor, the follower motor driving a second eccentric shaft among the two eccentric shafts;

determining in real-time a phase angle between the lead motor and follower motor quadrature currents by the processing circuitry;

modifying a rotation speed of the follower motor to be equal to a rotation speed of the leading motor by a closed loop control comprised in the processing circuitry; and when the rotation speed of the follower motor is equal to the rotation speed of the lead motor, modifying the rotation speed of the follower motor to adjust the phase angle to be equal to a main target phase angle by the processing circuitry.

The third aspect of the disclosure may seek to implement a method to detect and control the relative position of two rotating eccentric shafts. A technical benefit may include having a method that decreases the noise generated by the eccentric shafts and vibrating drums.

Optionally in some examples, including in at least one preferred example, the method further comprises:

modifying the rotation speed of the follower motor to adjust the phase angle to be equal to an auxiliary target phase angle by a closed control loop;

when the phase angle is equal to the auxiliary target phase angle and when the rotation speed of the follower motor is equal to the rotation speed of the lead motor, modifying the rotation speed of the follower motor to adjust the phase angle to be equal to a main target phase angle. A technical benefit may include more efficient position control.

Optionally in some examples, including in at least one preferred example, the method further comprises, in addition to modifying the rotation speed of the follower motor, modifying the rotation speed of the lead motor to adjust the phase angle to be equal to the main target phase angle. A technical benefit may include faster and more effective adjustment of the phase angle between the two eccentrics.

Optionally in some examples, including in at least one preferred example, the phase angle is determined by a phase locked loop. A technical benefit may include efficient phase angle determination.

Optionally in some examples, including in at least one preferred example, the rotation speed of the lead motor is equal to an initial rotation speed. A technical benefit may include better detection and control of the relative position of the two eccentric shafts rotating at an identical speed.

Optionally in some examples, including in at least one preferred example, the initial rotation speed is equal to or below 240 rpm, preferably below 60 rpm. A technical benefit may include more accurate calculation of the lead and follower motors quadrature currents, indicating eccentric positions.

Optionally in some examples, including in at least one preferred example, when the main target phase angle is reached, the rotation speeds of the lead motor and of the follower motor are modified to a final rotation speed. A technical benefit may include having a final rotation speed that is optimal for noise cancellation and/or vibration generation.

Optionally in some examples, including in at least one preferred example, the final rotation speed is equal to or greater than 1000 rpm, preferably equal to 4800 rpm. A technical benefit may include having a final rotation speed that are optimal for vibration generation needed to meet compaction requirements.

Optionally in some examples, including in at least one preferred example, the method further includes controlling the rotation speed of the lead and follower motors to maintain the phase angle equal to the main target phase angle. A technical benefit may include maintaining the phase angle constant and keeping the level of vibrations constant while maintaining good compaction efficiency.

Optionally in some examples, including in at least one preferred example, the method further includes controlling the rotation speed of the lead and/or follower motors to maintain the final rotation speed. A technical benefit may include constant vibration generation.

According to a fourth aspect of the disclosure, the invention relates to a computer program product comprising program code for performing, when executed by a processing circuitry, the method previously described.

The fourth aspect of the disclosure may seek to detect and control a relative position of two rotating eccentric shafts, in order to control the amount of noise generated by the eccentric shafts rotation inside their respective drums. A technical benefit may include physically implementing the method described above.

According to a fifth aspect of the disclosure, the invention relates to a non-transitory computer-readable storage medium comprising instructions, which when executed by a processing circuitry, cause the processing circuitry to perform the method described above.

The fifth aspect of the disclosure may seek to detect and control a relative position of two rotating eccentric shafts, in order to control the amount of noise generated by the eccentric shafts rotation inside their respective drums. A technical benefit may include physically implementing the method described above in a long-term storage medium.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
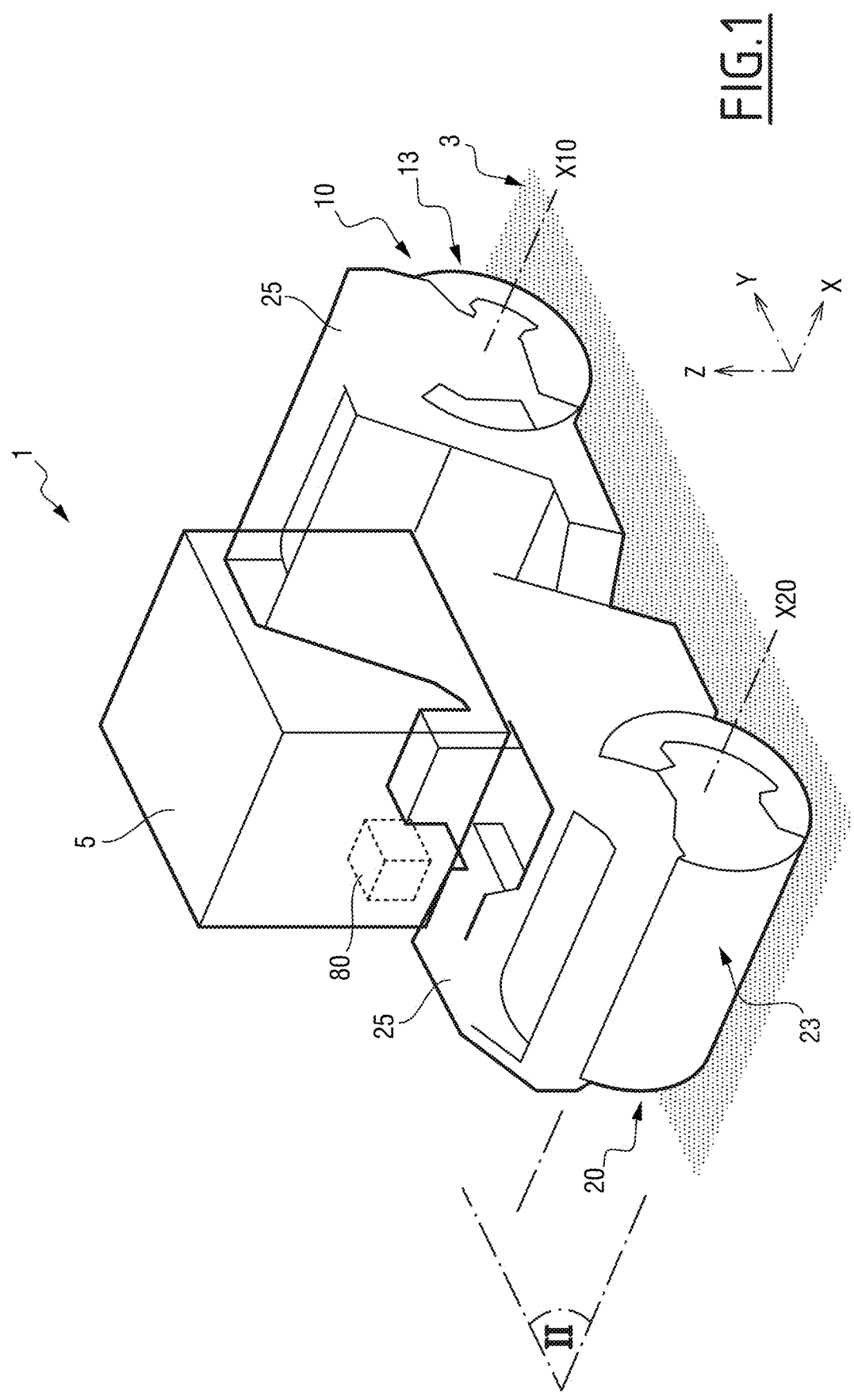
FIG. 1 is a perspective view of an exemplary vehicle according to an example.

FIG. 1 shows an example vehicle that is a roller compactor 1 for example. The roller compactor 1 is used to compact substrates such as soil, sand or asphalt, for example on construction sites. The roller compactor 1 stands on the ground 3, which for the sake of this description only, is considered horizontal. The roller compactor 1 comprises a driving cabin 5, a first drum 10, a second drum 20 and a frame 25.

In a not represented variant, the roller compactor comprises more than two drums.

A lateral direction X, a front direction Y and a height direction Z perpendicular to each other are defined relative to the roller compactor 1. The height direction Z is considered vertical.

When driving or operating the roller compactor 1, a driver or an operator is generally located inside the driving cabin 5.

The first and second drums 10 and 20 are cylindrical in the example of FIG. 1, but may have other shapes, such as a tapered cylinder. The first and second drums 10 and 20 may be similar, for example in diameter and weight, or may have different diameters and weights. The first and second drums 10 and 20 respectively comprise a first motor 11 and a second motor 21. The first motor 11, respectively the second motor 21, visible on FIG. 2, drives the first drum 10, respectively the second drum 20, in rotation around a first drum axis X10, respectively around a second drum axis X20. The first drum axis X10 and the second drum axis X20 are parallel to the lateral direction X and are parallel to each other in the example of the figures.

The first and second drums 10 and 20 respectively comprise a first surface 13 and a second surface 23. The first and second surfaces 13 and 23 are in contact with the ground 3 and/or the substrates to be compacted.

The frame 25 partially surrounds the first and second drums 10 and 20, so that they are connected to the rest of the roller compactor 1. The frame 25 may also serve to protect a user from the first and second drums 10 and 20, for example from touching the drums 10 and 20, or preventing projections of the substrate being compacted.

Figure 2:
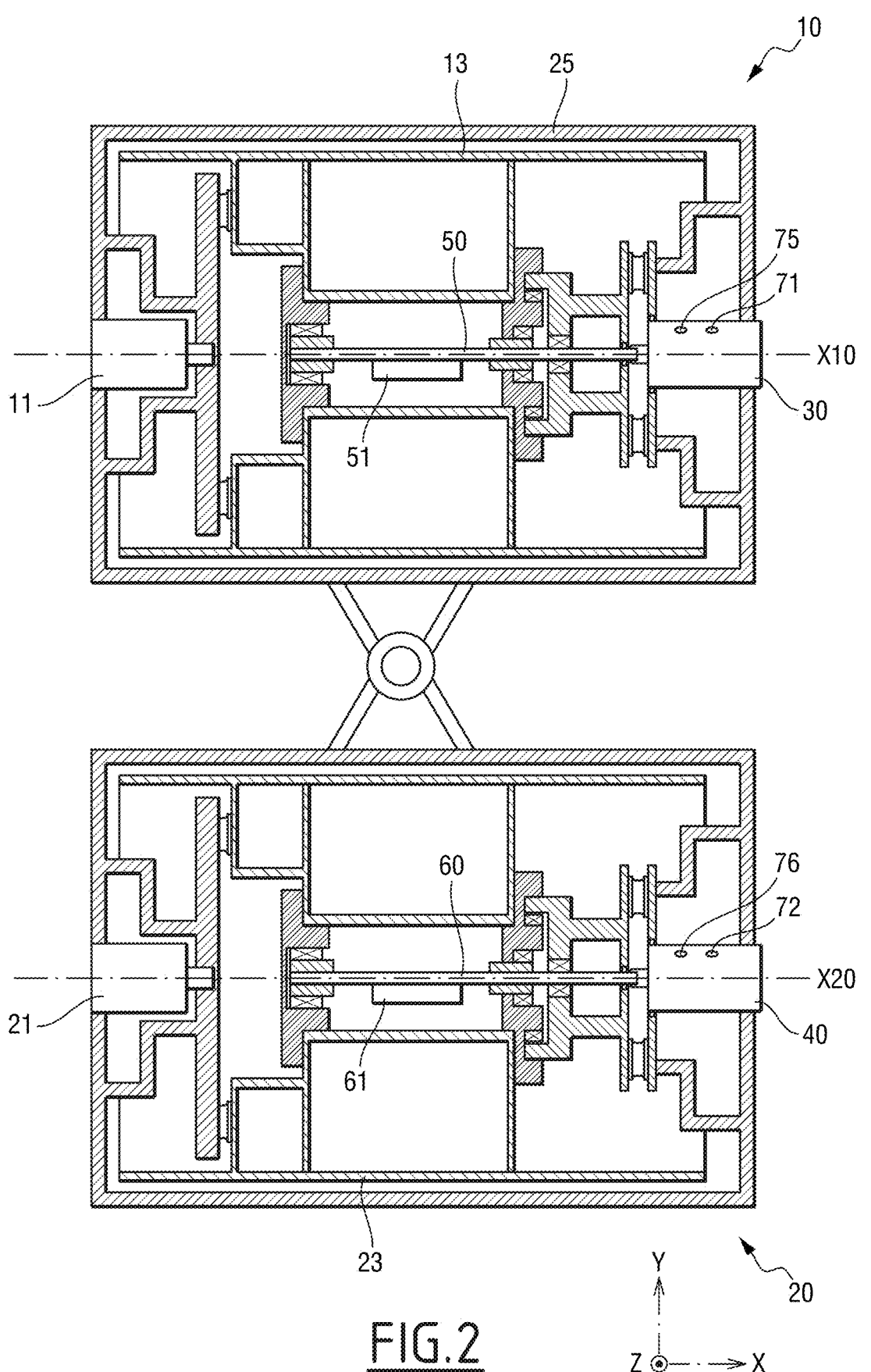
FIG. 2 is a cross-sectional view of the compactor machine of FIG. 1 along plane II.

With reference to FIG. 2, the roller compactor 1 further comprises a lead motor 30, and a follower motor 40. The lead motor 30 and the follower motor 40 are located respectively inside the first drum 10 and the second drum 20. The lead motor 30 and the follower motor 40 are electrical motors, in the example of FIG. 1, brushless direct current motors. When the lead and follower motors 30 and 40 are in operation, they are supplied with direct current from a battery, not represented, which is advantageously converted into a three-phased current. This conversion is well-known and not explained in detail.

As a variant, not represented, one or both of the lead motor and the following motor may be a different type of electric motor, such as an induction motor, brushed motor, or a brushless direct current motor.

The roller compactor 1 further comprises a first eccentric shaft 50 and a second eccentric shaft 60. The first eccentric shaft 50 is located inside the first drum 10 and extends along the first drum axis X10. In some examples, not represented, the first eccentric shaft is offset from the first drum axis. The first eccentric shaft 50 comprises a first eccentricity 51, fixed to the first eccentric shaft 50. The first eccentricity 51 is for example a mass of metal. In some examples, the first eccentricity 51 is integrally formed with the first eccentric shaft 50.

When the lead motor 30 is in operation, it drives the first eccentric shaft 50, with the first eccentricity 51 fixed to it, so that they rotate around the first drum axis X10. This rotation of the first eccentric shaft 50 causes the first drum 10 to vibrate along the height direction Z, which increases compaction power of the first drum 10.

In a similar manner to the first eccentric shaft 50, the second eccentric shaft 60 is located inside the second drum 20 and extends along the second drum axis X20. In some examples, not represented, the second eccentric shaft is offset from the second drum axis. The second eccentric shaft 60 comprises a second eccentricity 61, fixed to the second eccentric shaft 60. The second eccentricity 61 is for example a mass of metal. In some examples, the second eccentricity 61 is integrally formed with the second eccentric shaft 60. In some examples, the second eccentricity 60 has a mass identical to a mass of the first eccentricity 50.

When the follower motor 40 rotates, it drives the second eccentric shaft 60, with the second eccentricity 61 fixed to it, so that they rotate around the second drum axis X20, which causes the second drum 20 to vibrate along the height direction Z, thus increasing compaction power of the second drum 20.

In some examples, not represented, the lead motor is located inside the second drum and the follower motor inside the first drum. In this case, the lead motor drives the second eccentric shaft and the follower motor drives the first eccentric shaft.

The vibrations of the first drum 10 and the second drum 20 may cause disturbances for the surrounding environment of the roller compactor 1, and in particular may generate noise, unpleasant both for the driver or operator and for third parties close to the roller compactor 1. In order to control the vibrations and in particular limit the noise generated by the vibrations of the drums 10 and 20, the roller compactor 1 may further comprises angular position sensors 71, 72, current sensors 75 and 76, and a computer system 80.

Sensors 71 and 72 may be Hall probes, and in particular, each sensor 71 and 72 may be an array of three Hall probes. Sensor 71 is configured to detect an angular position of the lead motor 30 and sensor 72 is configured to detect an angular position of the follower motor 40.

Current sensors 75 and 76 measure an intensity of the current supplied respectively to the lead motor 30 and the follower motor 40. In some examples, current sensors 75 and 76 measure an intensity of the three-phase current supplied respectively to the lead motor 30 and the follower motor 40.

Figure 3:
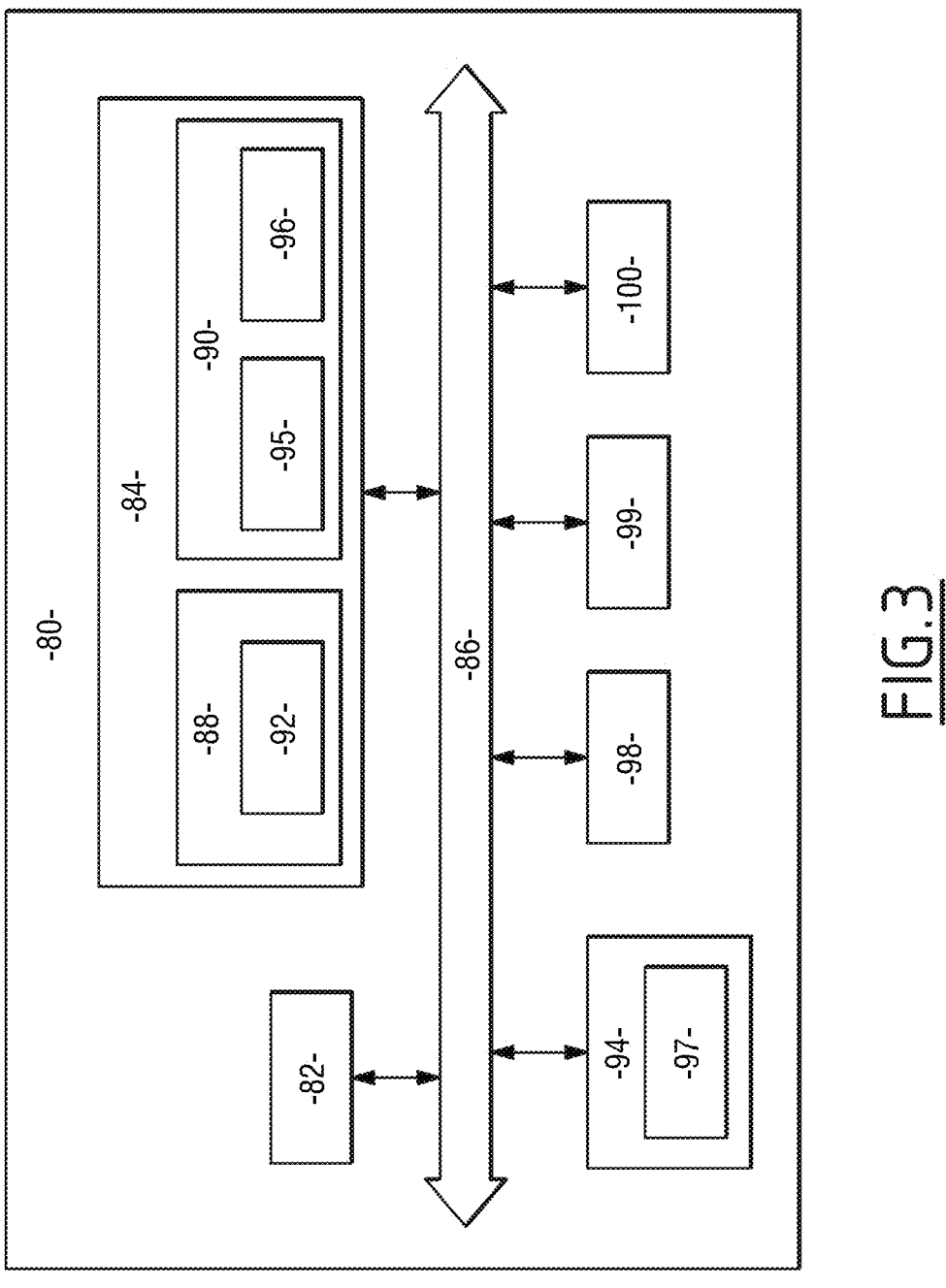
FIG. 3 is a schematic diagram of an exemplary computer system for implementing examples disclosed herein, according to an example.

FIG. 3 is a schematic diagram of a computer system 80 for implementing examples disclosed herein. The computer system 80 is adapted to execute instructions from a computer-readable medium to perform these and/or any of the functions or processing described herein. The computer system 80 may be connected (e.g., networked) to other machine components in a LAN, an intranet, an extranet, or the Internet. While only a single device is illustrated, the computer system 80 may include any collection of devices that individually or jointly execute a set, or multiple sets, of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set, or multiple sets of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 80 may comprise at least one computing device or electronic device capable of including firmware, hardware, and/or executing software instructions to implement the functionality described herein. The computer system 80 may include processing circuitry 82 such as processing circuitry including one or more processor devices or control units, a memory 84, and a system bus 86. The computer system 80 may include at least one computing device having the processing circuitry 82. The system bus 86 provides an interface for system components including, but not limited to, the memory 84 and the processing circuitry 82. The processing circuitry 82 may include any number of hardware components for conducting data or signal processing or for executing computer code stored in memory 84. The processing circuitry 82 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 82 may further include computer executable code that controls operation of the programmable device.

The system bus 86 may be any of several types of bus structures that may further interconnect to a memory bus, with or without a memory controller, a peripheral bus, and/or a local bus using any of a variety of bus architectures. The memory 84 may be one or more devices for storing data and/or computer code for completing or facilitating methods described herein. The memory 84 may include database components, object code components, script components, or other types of information structure for supporting the various activities herein. Any distributed or local memory device may be utilized with the systems and methods of this description. The memory 84 may be communicably connected to the processing circuitry 82 for example via a circuit or any other wired, wireless, or network connection and may include computer code for executing one or more processes described herein. The memory 84 may include non-volatile memory 88 such as read-only memory (ROM), erasable programmable read-only memory (EPROM), electrically erasable programmable read-only memory (EEPROM), etc., and volatile memory 90 such as random-access memory (RAM), or any other medium which can be used to carry or store desired program code in the form of machine-executable instructions or data structures and which can be accessed by a computer or other machine with processing circuitry 82. A basic input/output system (BIOS) 92 may be stored in the non-volatile memory 88 and can include the basic routines that help to transfer information between elements within the computer system 80.

The computer system 80 may further include or be coupled to a non-transitory computer-readable storage medium such as the storage device 94, which may comprise, for example, an internal or external hard disk drive (HDD), such as an enhanced integrated drive electronics (EIDE) or a serial advanced technology attachment (SATA), flash memory, or the like. The storage device 94 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 94 and/or in the volatile memory 90, which may include an operating system 95 and/or one or more program modules 96. All or a portion of the examples disclosed herein may be implemented as a computer program 97 stored on a transitory or non-transitory computer-usable or computer-readable storage medium, for example single medium or multiple media, such as the storage device 94, which includes complex programming instructions such as complex computer-readable program code to cause the processing circuitry 82 to carry out actions described herein. Thus, the computer-readable program code of the computer program 97 can comprise software instructions for implementing the functionality of the examples described herein when executed by the processing circuitry 82. In some examples, the storage device 94 may be an analog or digital computer program product such as a readable storage medium storing the computer program 97 thereon, where at least a portion of a computer program 97 may be loadable for example into a processor for implementing the functionality of the examples described herein when executed by the processing circuitry 82. The processing circuitry 82 may serve as a controller or control system for the computer system 80 that is to implement the functionality described herein.

The computer system 80 may include an input device interface 98 configured to receive input and selections to be communicated to the computer system 80 when executing instructions, such as from a keyboard, mouse, touch-sensitive surface, etc. Such input devices may be connected to the processing circuitry 82 through the input device interface 98 coupled to the system bus 86 but can be connected through other interfaces, such as a parallel port, an Institute of Electrical and Electronic Engineers (IEEE) 1394 serial port, a Universal Serial Bus (USB) port, an IR interface, and the like. The computer system 80 may include an output device interface 99 configured to forward output, such as to a display, a video display unit, such as a liquid crystal display (LCD) or a cathode ray tube (CRT). The computer system 80 may include a communications interface 100 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

When the lead and follower motors 30 and 40 are supplied with direct current by the battery, the computer system 80, more specifically the processing circuitry 82, receives angular position values measured by the position sensors 71 and 72 and current values measured by the current sensors 75 and 76. The computer system 80, more specifically the processing circuitry 82 is configured to calculate a lead motor quadrature current $I_{q1}$ of the lead motor 30, and a follower motor quadrature current $I_{q2}$ of the follower motor

40, more specifically by using the position and current values to perform the calculation. The calculation may be performed through Park transform.

In some embodiments, the processing circuitry 82 comprises a first sub-module for calculating the lead motor quadrature current $I_{q1}$, a second sub-module for calculating the follower motor quadrature currents and $I_{q2}$ and a third sub-module for performing the other functions outlined in the description. The third sub-module communicates with the first and second sub-module, in particular so that the third sub-module acquires the values of the lead motor and follower motor quadrature currents. The first sub-module may for example be integrated in the leading motor, and the second sub-module may be integrated in the follower motor.

The lead motor quadrature current $I_{q1}$ depends on friction, gravitational, and centrifugal forces applied to the lead motor 30 and on a torque output by the lead motor 30.

When the lead motor 30 rotates at low speeds, for example 60 rotations per minute or rpm and below, the friction and centrifugal forces are negligible and the lead motor quadrature current $I_{q1}$ is approximated to be proportional to the torque output by the lead motor 30. As the lead motor 30 drives the first eccentric shaft 50, the torque output by the lead motor 30 is not constant but varies sinusoidally. A maximum torque corresponding to a maximum lead motor quadrature current $I_{q1}$ is output when the first eccentric shaft 50 is at a point in a rotation around the first axis X10 that is closest to the ground 3, measured along the height direction Z. A minimum torque, corresponding to a minimum lead motor quadrature current $I_{q1}$ is output when the first eccentric shaft 50 is at its point in the rotation around the first axis X10 that is the furthest from the ground 3, measured along the height direction Z. Therefore, the lead motor quadrature current $I_{q1}$ is directly related to an angular position of the first eccentric shaft 50.

This also applies to the follower motor quadrature current $I_{q2}$ which is also approximated to be proportional to a torque output by the follower motor 40 and also varies sinusoidally. The follower motor quadrature current $I_{q2}$ is therefore directly related to an angular position of the second eccentric shaft 60.

If no specific position control is performed, the angular position of the first eccentric shaft 50 is independent from the angular position of the second eccentric shaft 60. In the example represented in the figures, a relative position of the two eccentric shafts 50 and 60 is monitored by determining a phase angle $\Phi$ between the lead motor quadrature current $I_{q1}$ and the follower motor quadrature current $I_{q2}$.

The processing circuitry 82 is configured to determine the phase angle $\Phi$ in real time. This is performed for example by using a phase locked loop, or by calculating a cross correlation between the first and the follower motor quadrature currents $I_{q1}$ and $I_{q2}$.

The processing circuitry 82 is further configured to modify the rotation speed of the follower motor 40 to be equal to a rotation speed of the leading motor 30. This is done by a closed loop control, comprised in the processing circuitry 82. In some examples, the closed loop is a Proportional, Integral, Derivative controller.

By "two angles are equal", it is meant that there is a difference of one degree or less between the two angles. When the rotation speed of the follower motor 40 is equal to the rotation speed of the lead motor 30, the processing circuitry 82 is further configured to modify the rotation speed of the follower motor 40 to adjust the phase angle $\Phi$ to be equal to a main target phase angle $\Phi_2$.

In some examples, the processing circuitry 82 is further configured to modify the rotation speed of the follower motor 40 to adjust the phase angle $\Phi$ to be equal to an auxiliary target phase angle $\Phi_1$ by a closed control loop. In that case, the rotation speed of the follower motor 40 is modified to adjust the phase angle $\Phi$ to be equal to the main target phase angle $\Phi_2$ when both the rotation speed of the follower motor 40 is equal to the rotation speed of the lead motor 30, as previously mentioned, and the phase angle $\Phi$ is equal to the auxiliary target phase angle $\Phi_1$.

The auxiliary target phase angle $\Phi1$ is for example equal to zero degrees. The main target phase angle $\Phi_2$ is generally different from the auxiliary target phase angle $\Phi_1$, but may be equal to the auxiliary target phase angle $\Phi_1$ in some examples. In some examples, the main target phase angle $\Phi_2$ is determined by an algorithm, for example a noise cancellation algorithm, which determines which value of main target phase angle $\Phi_2$ reduces the most the noise caused by the vibrations of the first and second drums 10 and 20.

In some examples, the processing circuitry 82 is further configured to eliminate random phase angle differences between the first and follower motor quadrature currents $I_{q1}$ and $I_{q2}$. The random phase angle differences may be considered to be noise, and are for example due to a movement of the roller compactor 1 or due to ambient disturbances of the lead and/or follower motor 30 and 40.

In some examples, the processing circuitry 82 is configured to modify the rotation speed both of the follower motor 40 and of the lead motor 30 to adjust the phase angle $\Phi$ to be equal to the auxiliary target phase angle $\Phi_1$ and to the main target phase angle $\Phi_2$.

Figure 4:
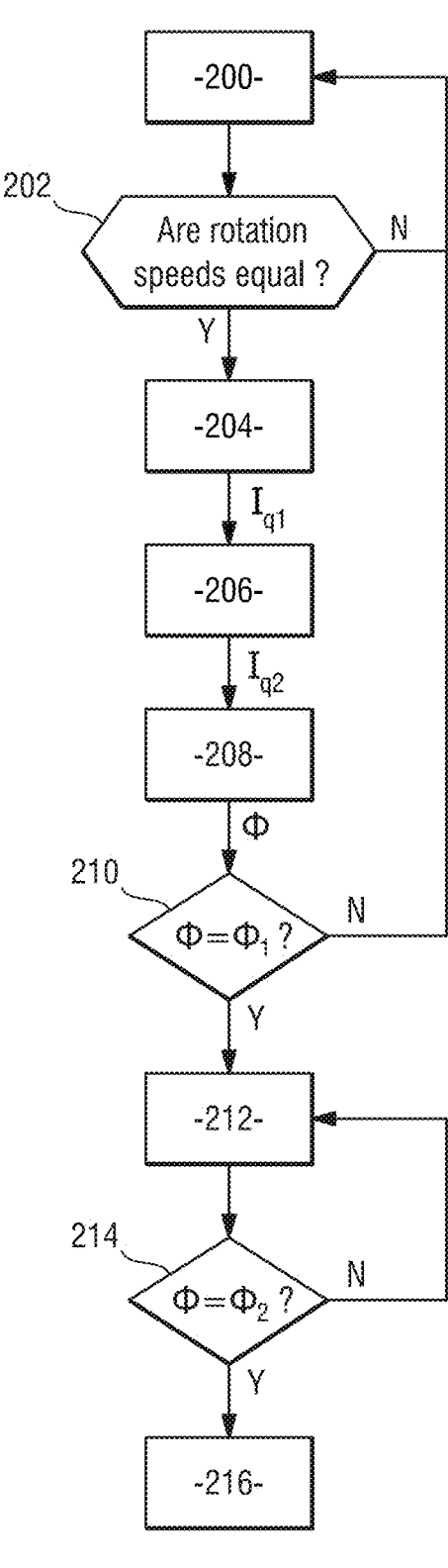
FIG. 4 is a flow chart of an exemplary method to detect and control the relative position of two rotating eccentric shafts, according to an example.

A method for detecting and controlling the relative position of the first and the second rotating eccentric shafts 50 and 60 will now be described, in relation to FIG. 4. The method is implemented by the processing circuitry 82 of computer system 80.

A driver or an operator starts the roller compactor 1, in particular by commanding the battery to supply the lead and follower motors 30 and 40 with direct current. The lead motor 30 is commanded to rotate at an initial rotation speed. The initial rotation speed in some examples is equal to or below 150 rpm, preferably below 60 rpm. In step 200, the processing circuitry 82 commands the follower motor 30 and 40 to rotate at a first rotation speed.

In step 202, the processing circuitry 82 compares the rotation speeds of the lead motor 30 and of the follower motor 40. If the rotation speeds are not equal, then step 200 is performed again. In this case, when performing step 200, the processing circuitry 82 modifies the first rotation speed of the follower motor 40 so that it is different at first from the previous first rotation speed.

If the rotation speeds are equal, in other words, it the first rotation speed of the follower motor 40 is equal to the initial speed, then step 204 is performed.

The processing circuitry 82 receives the angular positions of the first and second eccentric shafts 50 and 60, and the three-phased current intensity supplied to the lead and following motors 30 and 40 respectively from position sensors 71, 72 and current sensors 75 and 76.

In step 204, the processing circuitry 82 calculates the lead motor quadrature current $I_{q1}$, which allows to detect the position of the first eccentric shaft 50.

In step 206, the processing circuitry 82 calculates the lead motor quadrature current $I_{q2}$ which allows to detect the position of the second eccentric shaft 60. In particular, the processing circuitry 82 uses the position and current intensity values to perform steps 204 and 206. Steps 204 and 206 are performed in real time.

In step 208, the processing circuitry 82 determines in real-time the phase angle $\Phi$, which is related to the relative position of the first and the second eccentric shaft 50 and 60. As mentioned previously, in some examples, the phase angle $\Phi$ is determined by a phase locked loop comprised in the processing circuitry 82, or by cross-correlation.

In step 210, the processing circuitry 82 compares the phase angle $\Phi$ to the auxiliary target phase angle $\Phi_1$. If the phase angle $\Phi$ is not equal to the auxiliary target phase angle $\Phi_1$, then the processing circuitry 82 performs again steps 200 to 208. In this case, when performing step 200, the processing circuitry 82 modifies the first rotation speed of the follower motor 40 so that it is different at first from the previous first rotation speed, to modify the phase angle $\Phi$ in order to obtain an updated phase angle $\Phi$. Step 202 ensures that the first rotation speed of the follower motor 40 then becomes equal again to the initial rotation speed. This is particularly advantageous, to maintain the updated phase angle $\Phi$ constant.

The modification of the first rotation speed in step 200 is performed by a closed loop control comprised in the processing circuitry 82. In some examples, the closed loop control is a Proportional, Integral, Derivative controller comprised in the processing circuitry 82.

In some examples, during steps 200 to 210, the processing circuitry 82 maintains the rotation speed of the lead motor 30 equal to the initial rotation speed. By equal to a said rotation speed, it is meant that the rotation speed of lead motor 30 and/or the follower motor 40 is equal to the said rotation speed, more or less 5 rpm.

If the phase angle $\Phi$ is equal to the auxiliary target phase $\Phi_1$, then the first and the second eccentric shafts 50 and 60 are synchronized. The phase angle $\Phi$ is then adjusted to be equal to the main target phase angle $\Phi_2$. To do so, the processing circuitry 82 performs step 212. In step 212, the processing circuitry 82 modifies the rotation speed of the follower motor 40. In step 212, the rotation speed of the follower motor 30 stays equal to or below 240 rpm. In some examples, step 212 is performed by a closed loop control.

Steps 200 to 212 are done at the first rotation speed to facilitate the position control, as, at the first rotation speed, the first and follower motor quadrature current $I_{q1}$ and $I_{q2}$ are proportional to the torque, which is directly related to the position of the first and second eccentric shafts 50 and 60, and the disturbances, due for example to centrifugal forces and friction, are negligible. The position detection and control is therefore more efficient at the first rotation speed than at higher rotation speeds, in particular the rotation speeds used to compact substrates.

In step 214, the processing circuitry 82 compares the phase angle $\Phi$ to the main target phase angle $\Phi_2$. As the phase angle $\Phi$ is calculated in real time, the phase angle $\Phi$ is updated to reflect the modification of the rotation speed of the follower motor 40.

If the phase angle $\Phi$ is not equal to the main target phase angle $\Phi_2$, then the processing circuitry 82 performs again step 212, to adjust the rotation speed of the follower motor 40.

If the phase angle $\Phi$ is equal to the main target phase angle $\Phi_2$, then the processing circuitry 82 performs step 216. In step 216, the processing circuitry 82 modifies the rotation speed of the lead and follower motors 30 and 40 to a final rotation speed. The final rotation speed is greater than the initial rotation speed, and is the rotation speed used for compacting substrates. In some examples, the final rotation speed is equal or greater than 1000 rpm, preferably equal to or greater than 4800 rpm. In some examples, step 216 is performed by a Proportional, Integral, Derivative, Feedforward controller comprised in the processing circuitry 82.

Once step 216 is performed, the processing circuitry 82 preferably maintains the lead motor 30 and/or the follower motor 40 rotating at the final rotation speed and the phase angle $\Phi$ equal to the main target phase angle $\Phi_2$ for as long as the first and second drums 10 and 20 are in operation. In some examples, to maintain the phase angle $\Phi$ equal to the main target phase angle $\Phi_2$, the processing circuitry 82 may change the rotation speed of the lead motor 30 and/or the follower motor 40 so that it is transitorily different from the final rotation speed.

In some examples, it is not verified whether or not the phase angle $\Phi$ is equal to the auxiliary target phase angle $\Phi_1$, in other words, steps 204 is not performed. In this case, step 212 is not performed either. Instead, after step 208 is completed, step 214 is performed directly after. If the phase angle $\Phi$ is not equal to the main target phase angle $\Phi2$, then the processing circuitry 82 performs again step 200.

In some examples, both the rotation speeds of the lead motor 30 and the follower motor 40 are modified in steps 200, 212 and 216. The modification of the lead motor's 30 rotation speed may be controlled by a closed loop, for example a Proportional, Integral, Derivative controller comprised in the processing circuitry 82.

Preferably, steps 200 to 216 are performed in less than five seconds, preferably in less than 3 seconds.

In not represented examples, the lead and following motors are brushed DC motors, or motors that directly use a DC current, without conversion into three-phased current. In this case, the first and follower motor quadrature current are equal to the supply current received by the lead and follower motors.

In not represented examples, a motor phase angle is also calculated, using the difference of position between the lead and the follower motor, which is used by the processing circuitry in addition to the phase angle when modifying the speed of the follower motor to reach the first and main target phase angles. This allows to better take into account differences between angular positions of the motors and the eccentric shafts, which may be caused by vibrations of the eccentric shafts, when modifying the rotation speed of the lead and follower motors.

Example 1: A computer system (80) for detecting and controlling a relative position of two rotating eccentric shafts (50, 60), the computer system (80) comprising processing circuitry (82) configured to:

calculate a lead motor quadrature current ($I_{q1}$) of a lead motor (30) driving a first eccentric shaft (50) among the two eccentric shafts (50, 60);

calculate a follower motor quadrature current ($I_{q2}$) of a follower motor (40) driving a second eccentric shaft (60) among the two eccentric shafts (50, 60);

determine in real-time a phase angle ($\Phi$) between the lead motor and follower motor quadrature currents ($I_{q1}$, $I_{q2}$);

modify a rotation speed of the follower motor (40) so that it is equal to a rotation speed of the leading motor (30) by a closed loop control; and when the rotation speed of the follower motor (40) is equal to the rotation speed of the lead motor (30), modify the rotation speed of the follower motor (40) to adjust the phase angle ($\Phi$) to be equal to a main target phase angle ($\Phi_2$).

Example 2: The computer system (80) of example 1, wherein the processing circuitry (82) is further configured to:

modify the rotation speed of the follower motor (40) to adjust the phase angle ($\Phi$) to be equal to an auxiliary target phase angle ($\Phi_1$) by a closed control loop; and when the phase angle ($\Phi$) is equal to the auxiliary target phase angle ($\Phi_1$) and when the rotation speed of the follower motor (40) is equal to the rotation speed of the lead motor (30), modify the rotation speed of the follower motor (40) to adjust the phase angle ($\Phi$) to be equal to the main target phase angle ($\Phi_2$).

Example 3: The computer system (80) of any of examples 1 and 2, wherein the processing circuitry (82) is further configured to, in addition to modifying the rotation speed of the follower motor (40), modify the rotation speed of the lead motor (30) to adjust the phase angle ($\Phi$) to be equal to the main target phase angle ($\Phi 2$).

Example 4: The computer system (80) of any of examples 1 to 3, wherein the processing circuitry (82) is further configured to, when the phase angle ($\Phi$) is equal to the main target phase angle ($\Phi_2$), control the rotation speed of the lead motor (30) and/or the follower motor (40) to maintain the phase angle ($\Phi$) equal to the main target phase angle ($\Phi_2$).

Example 5: The computer system (80) of any of examples 1 to 4, wherein the processing circuitry (82) is configured to determine the phase angle ($\Phi$) between the lead motor and follower motor quadrature currents ($I_{q1}$, $I_{q2}$) by a phase locked loop.

Example 6: A vehicle (1) comprising the computer system (80) of any of examples 1 to 5.

Example 7: The vehicle (1) of example 6, further comprising:

a lead motor (30) and a follower motor (40); and a first and a second drum (10, 20), the first drum (10) comprising a first eccentric shaft (50) and the second drum (20) comprising a second eccentric shaft (60), the first eccentric shaft (50) being connected to the lead motor (30), the lead motor (30) being configured to drive the first eccentric shaft (50) and the second eccentric shaft (60) being connected to the follower motor (40), the follower motor (40) being configured to drive the second eccentric shaft (60).

Example 8: The vehicle (1) of any of examples 6 and 7, wherein at least one of the lead motor (30) and the follower motor (40) is a brushless direct current motor.

Example 9: A computer-implemented method for detecting and controlling the relative position of two rotating eccentric shafts (50, 60), the method comprising:

calculating (204), by a processing circuitry (82) of a computer system (80), a lead motor quadrature current ($I_{q1}$) of a lead motor (30), the lead motor (30) driving a first eccentric shaft (50) among the two eccentric shafts (50, 60);

calculating (206), by the processing circuitry (82), a follower motor quadrature current ($I_{q2}$) of a follower motor (40), the follower motor (40) driving a second eccentric shaft (60) among the two eccentric shafts (50, 60);

determining (208) in real-time a phase angle ($\Phi$) between the lead motor and follower motor quadrature currents ($I_{q1}$, $I_{q2}$) by the processing circuitry (82);

modifying (200) a rotation speed of the follower motor (40) to adjust the phase angle ($\Phi$) to be equal to a first target phase angle ($\Phi_1$) by a closed loop control comprised in the processing circuitry (82); and when the rotation speed of the follower motor (40) is equal to the rotation speed of the lead motor (30), modifying (212) the rotation speed of the follower motor (40) to adjust the phase angle ($\Phi$) to be equal to a main target phase angle ($\Phi_2$) by the processing circuitry (82).

Example 10: The method of example 9, further comprising:

modifying (200) the rotation speed of the follower motor (40) to adjust the phase angle ($\Phi$) to be equal to an auxiliary target phase angle ($\Phi_1$) by a closed control loop;

when the phase angle is equal to the auxiliary target phase angle and when the rotation speed of the follower motor (40) is equal to the rotation speed of the lead motor (30), modifying (200) the rotation speed of the follower motor (40) to adjust the phase angle ($\Phi$) to be equal to a main target phase angle ($\Phi_2$).

Example 11: method of any of examples 9 and 10, further comprising, in addition to modifying (212) the rotation speed of the follower motor (40), modifying the rotation speed of the lead motor (30) to adjust the phase angle ($\Phi$) to be equal to the main target phase angle ($\Phi 2$).

Example 12: The method of any of examples 9 to 11, wherein the phase angle ($\Phi$) is determined by a phase locked loop.

Example 13: The method of any of examples 9 to 12, wherein the rotation speed of the lead motor (30) is equal to an initial rotation speed.

Example 14: The method of example 13, wherein the initial rotation speed is equal to or below 240 rpm, preferably below 60 rpm.

Example 15: The method of any of examples 9 to 14, wherein when the main target phase angle ($\Phi_2$) is reached, the rotation speeds of the lead motor (30) and of the follower motor (40) are modified (216) to a final rotation speed.

Example 16: The method of example 15, wherein the final rotation speed is equal to or greater than 1000 rpm, preferably equal to or greater than 4800 rpm.

Example 17: The method of any of examples 15 or 16, further including controlling the rotation speed of the lead and follower motors (30, 40) in order to maintain the phase angle ($\Phi$) equal to the main target phase angle ($\Phi_2$).

Example 18: The method of any of examples 15 to 17, further including controlling the rotation speed of the lead and/or follower motors (30, 40) to maintain the final rotation speed.

Example 19: A computer program product (94) comprising program code for performing, when executed by a processing circuitry (82), the method of any of examples 9 to 18.

Example 20: A non-transitory computer-readable storage medium (94) comprising instructions, which when executed by a processing circuitry (82), cause the processing circuitry (82) to perform the method of any of examples 9 to 18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system for detecting and controlling a relative position of two rotating eccentric shafts, the computer system comprising processing circuitry configured to:
    calculate a lead motor quadrature current of a lead motor driving a first eccentric shaft among the two eccentric shafts;
    calculate a follower motor quadrature current of a follower motor driving a second eccentric shaft among the two eccentric shafts;
    determine in real-time a phase angle between the lead motor and follower motor quadrature currents);
    modify a rotation speed of the follower motor so that it is equal to a rotation speed of the leading motor by a closed loop control; and
    when the rotation speed of the follower motor is equal to the rotation speed of the lead motor, modify the rotation speed of the follower motor to adjust the phase angle to be equal to a main target phase angle.

2. The computer system of claim 1, wherein the processing circuitry is further configured to:

modify the rotation speed of the follower motor to adjust the phase angle to be equal to an auxiliary target phase angle by a closed control loop; and
    when the phase angle is equal to the auxiliary target phase angle and when the rotation speed of the follower motor is equal to the rotation speed of the lead motor, modify the rotation speed of the follower motor to adjust the phase angle to be equal to the main target phase angle.

3. The computer system of claim 1, wherein the processing circuitry is further configured to,
    in addition to modifying the rotation speed of the follower motor, modify the rotation speed of the lead motor to adjust the phase angle to be equal to the main target phase angle.

4. The computer system of claim 1, wherein the processing circuitry is further configured to, when the phase angle is equal to the main target phase angle, control the rotation speed of the lead motor and/or the follower motor to maintain the phase angle equal to the main target phase angle.

5. The computer system of claim 1, wherein the processing circuitry is configured to determine the phase angle between the lead motor and follower motor quadrature currents by a phase locked loop.

6. A vehicle comprising the computer system of claim 1.

7. The vehicle of claim 6, further comprising:
    a lead motor and a follower motor; and
    a first and a second drum, the first drum comprising a first eccentric shaft and the second drum comprising a second eccentric shaft, the first eccentric shaft being connected to the lead motor, the lead motor being configured to drive the first eccentric shaft and the second eccentric shaft being connected to the follower motor, the follower motor being configured to drive the second eccentric shaft.

8. The vehicle of claim 6, wherein at least one of the lead motor and the follower motor is a brushless direct current motor.

9. A computer-implemented method for detecting and controlling the relative position of two rotating eccentric shafts, the method comprising:
    calculating, by a processing circuitry of a computer system, a lead motor quadrature current of a lead motor, the lead motor driving a first eccentric shaft among the two eccentric shafts;
    calculating, by the processing circuitry, a follower motor quadrature current of a follower motor, the follower motor driving a second eccentric shaft among the two eccentric shafts;
    determining in real-time a phase angle between the lead motor and follower motor quadrature currents by the processing circuitry;
    modifying a rotation speed of the follower motor to be equal to a rotation speed of the leading motor by a closed loop control comprised in the processing circuitry; and
    when the rotation speed of the follower motor is equal to the rotation speed of the lead motor, modifying the rotation speed of the follower motor to adjust the phase angle to be equal to a main target phase angle by the processing circuitry.

10. The method of claim 9 further comprising:
    modifying the rotation speed of the follower motor to adjust the phase angle to be equal to an auxiliary target phase angle by a closed control loop;

when the phase angle is equal to the auxiliary target phase angle and when the rotation speed of the follower motor is equal to the rotation speed of the lead motor, modifying the rotation speed of the follower motor to adjust the phase angle to be equal to a main target phase angle.

11. The method of claim 9, further comprising, in addition to modifying the rotation speed of the follower motor, modifying the rotation speed of the lead motor to adjust the phase angle to be equal to the main target phase angle.

12. The method of claim 9, wherein the phase angle is determined by a phase locked loop.

13. The method of claim 9, wherein the rotation speed of the lead motor is equal to an initial rotation speed.

14. A computer program product comprising program code for performing, when executed by a processing circuitry, the method of claim 9.

15. A non-transitory computer-readable storage medium comprising instructions, which when executed by a processing circuitry, cause the processing circuitry to perform the method of claim 9.

* * * * *